Figure 1:
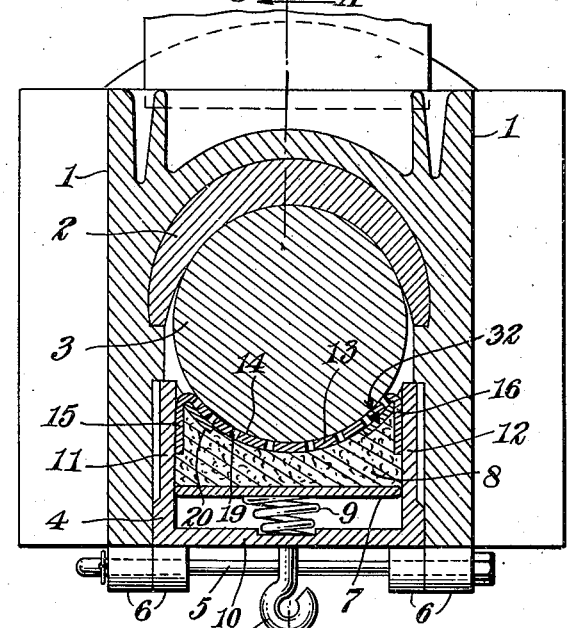

Jan. 2, 1940.  F. C. LANGDON  2,185,792
JOURNAL BOX LUBRICATOR
Filed Feb. 8, 1939

Inventor.
FRED C. LANGDON
BY Laurence E. Voorhees
ATTORNEY

Patented Jan. 2, 1940

2,185,792

UNITED STATES PATENT OFFICE 2,185,792

JOURNAL BOX LUBRICATOR

Fred C. Langdon, Washington, D. C.

Application February 8, 1939, Serial No. 255,337

9 Claims. (Cl. 308—83)

My invention relates to journal box lubricators and more particularly to the types used on locomotives.

The principal object of my invention is to provide a baffle member especially designed to be attached to and cooperate with the existing conventional type of lubricant distributing plate associated with locomotive journal box lubricators, for reducing the amount of waste lubricant to a minimum.

Another object of my invention is to provide an improved lubricant distributing plate which may be applied to existing locomotive journal box lubricators without any modification in the associated parts thereof.

An important object of my invention is to accomplish the above new and useful results in the most economical manner consistent with safe and dependable service.

Other novel features of my invention from a practical standpoint will be apparent as hereinafter illustrated and/or described.

Figure 4:
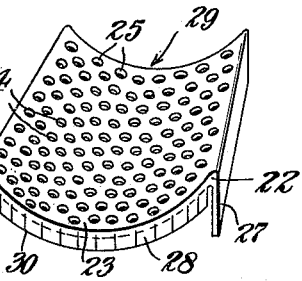
Figure 2:
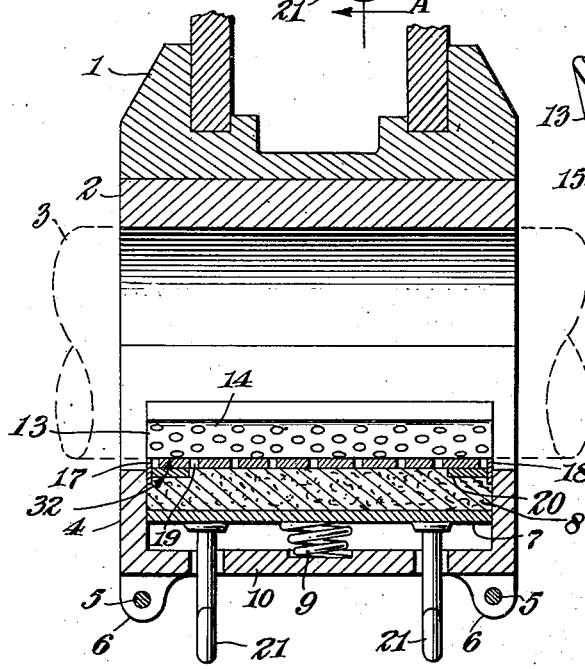
Figure 3:
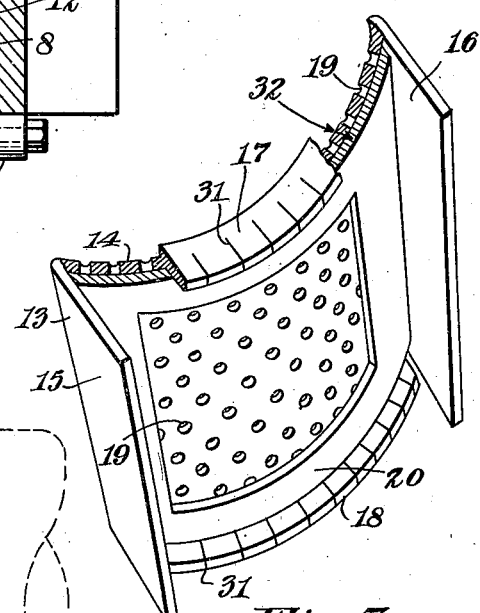

In the drawing wherein like numerals represent like parts:

Fig. 1 is a transverse vertical sectional view through a journal box and associated lubricator to which an embodiment of my invention has been applied, Fig. 2 is a sectional view at right angles to that shown in Figure 1 taken on line A—A thereof, Fig. 3 is a perspective view of a conventional type of lubricant distributing plate showing the application of an embodiment of my invention thereto, and Fig. 4 is a perspective view of another form of my improved lubricant distributing plate embodying my invention.

In Figures 1 and 2 of the drawing which show the conventional type of locomotive driving box with associated journal and journal lubricating equipment now in general use modified to embody my invention, 1 is the driving box having a brass or bearing 2 positioned between the upper part thereof and the upper surface of the journal 3. A grease cellar 4 is removably supported in the lower part of driving box 1 by means of bolts 5 extending through apertured lugs 6 on the journal box and cellar. A follower plate 7 is urged upwardly against a grease cake 8 by means of coil spring 9 positioned between follower plate 7 and the bottom wall 10 of cellar 4. The grease cake 8 carries a lubricant distributing plate 13 positioned on its upper surface and fills substantially the entire space between the side walls 11 and 12 of cellar 4, the follower plate 7 and the lubricant distributing plate 13.

The lubricant distributing plate 13, shown in detail in Figure 3, comprises a curved portion 32 adapted to fit concentrically around the lower surface of the journal 3, said curved portion 32 provided with depending side flanges 15 and 16 and depending end flanges 17 and 18, said side flanges slidably positioned against side walls 11 and 12 respectively of cellar 4, and said end flanges having slits 31. The width of the curved portion 32 of the lubricant distributing plate 13 is substantially the same as the diameter of journal 3.

Curved portion 32 of the lubricant distributing plate 13 comprises a curved member 14 containing perforations 19 distributed throughout its entire surface, and an imperforated baffle member 20 having a central opening or window, said baffle member positioned adjacent to and contiguous with the convex surface of the peripheral marginal portion of the curved member 14. The perforations 19, distributed throughout the entire peripheral marginal portion of the curved member 14, are transformed into pockets opening on the concave surface of said peripheral marginal portion of said curved member 14 by baffle member 20. The lubricant distributing plate 13 comprises the entire structure positioned on and supported by the upper surface of the grease cake 8, and also positioned between said upper surface of the grease cake 8 and the lower surface of the journal 3 for the purpose of distributing lubricant over the surface of said journal 3. The distributing plate 13 may be constructed of sheet metal or other suitable material.

A pair of eye bolts 21 are attached to the follower plate 7 and extend downwardly through holes in the bottom wall 10 of the grease cellar 4 and constitute a means for retracting the follower plate 7 when changing the grease cake and also for indicating, by their exposed portions, the amount of unconsumed grease.

Figure 4 of the drawing shows another form of lubricant distributing plate 22 embodying my invention. Curved portion 23 of lubricant distributing plate 22 has its central portion provided with perforations 24 and its peripheral marginal imperforated portion, which surrounds the central perforated portion, provided with pockets 25, said indentations being distributed throughout the concave surface of said peripheral marginal portion. Curved portion 23 is provided with depending side flanges 26 and 27 and depending end flanges 28 and 29. Flanges 28 and 29 have slits 30.

The following is a description of the operation of the conventional locomotive driving box journal lubricator as shown in Figures 1, 2 and 3 of the accompanying drawing without the application of any embodiment of my invention thereto. Baffle member 20, shown in Figures 1, 2 and 3, should be omitted when considering the following description of said conventional driving box, leaving curved member 14 alone constituting the curved portion of the lubricant distributing plate 13.

Driving box 1 is positioned in pedestals which form a part of the locomotive frame not shown in the drawing. Bearing 2 distributes the load to the upper surface of the axle journal 3 and is lubricated by lubricant applied to the lower surface of said journal.

The lubricant is provided in the form of a grease cake 8 with a distributing plate 13 supported on its upper surface. The curved portion of the distributing plate 13 consists of a curved member 14, perforated throughout its entire surface, and curved to conform to the lower curved surface of the journal 3, said curved member 14 provided with depending side flanges 15 and 16 and depending end flanges 17 and 18. The end flanges 17 and 18 are usually slitted in order to permit a slight change in the curvature of the curved member 14 of plate 13 as an aid in maintaining the best conformity between the concave surface of the curved member 14 of the distributing plate 13 and the lower surface of the journal 3.

The grease cake 8 is positioned in a removable grease cellar 4 the sides 11 and 12 of which act as guides against which the flanges 15 and 16 of the distributing plate 13 move. The grease cake 8 is urged toward the journal 3 by spring 9 which is compressed between the follower plate 7 and the bottom wall 10 of the cellar 4. The removable cellar 4 is held in place by bolts 5. The width of the lubricating plate 13 is approximately the same as the diameter of journal 3 so that the grease cake 8 fills substantially the entire space between the follower 7, the side walls 11 and 12 of cellar 4 and the curved member 14 of distributing plate 13.

It will be noted that the pressure of the spring 9 not only forces the grease cake up against the convex surface of the curved member of the distributing plate, but also forces the entire concave surface of the curved member of the distributing plate against the lower surface of the journal. As the journal rotates, the friction between the surface of the journal and the surface of the curved member of the distributing plate produces heat which in turn softens the uppermost layer of the grease cake causing the grease to feed through the perforations 19 and be wiped on the surface of the journal and thence to the bearing 2.

The lubricating means employed in the lubricators in general use at the present time has resulted in the waste of a large proportion of the grease applied as well as high lubrication maintenance costs. The causes of the waste of lubricant will now be disclosed.

When a journal is new it has a certain standard diameter and the perforated member 14 of the new distributing plate will be in contact with the journal throughout its entire area. The journal will contact and collect grease from all the perforations at a uniform rate provided the distributing plate has an even temperature. Due to the lateral oscillating movement of the journal, a large amount of grease is ribboned out along both ends of the journal. This grease becomes contaminated with dirt which renders it unsuitable for reuse. The temperature of the hub end of the journal is usually higher than the tail end. The hubs of the driving wheels which take the lateral thrust when a locomotive is traveling on a curve, experience relatively higher periodic temperatures. This temperature difference between the hub and tail ends of the journal, which exists at certain times, causes the grease to flow faster at the hub than at the tail, thereby causing the grease cake to become wedge shaped necessitating early removal due to binding in the cellar and uneven feeding.

When the journal becomes worn or is redressed to remove irregularities, its diameter is decreased so that its associated lubricant distributing plate is not in contact with the surface of the journal throughout its entire area. Marginal areas on both sides of the perforated curved member 14 of the distributing plate are, therefore, not in contact with the surface of the journal and the grease which feeds through the perforations in these marginal areas piles up in the space between the distributing plate and the surface of the journal. Grease will continue to flow through the perforations in these marginal areas and be lost until the perforations become obstructed. In time the grease which is piled up on these marginal areas will become contaminated with dirt, and then considerable dirty grease is carried into the bearing at the rising side of the journal causing deleterious results. The contaminated grease which is piled up on the marginal area of the distributing plate at the descending side of the journal is wiped into the lubricating area and becomes mixed with the fresh grease feeding through the perforations in the area of the distributing plate that is in contact with the journal. In practice the contaminated grease which piles up on these marginal areas becomes hard and forms a cake which obstructs any further feeding of fresh grease through the perforations in these areas. When a locomotive driving journal has been machined until its minimum diameter allowed by law has been reached, the width of the marginal areas on each side of the lubricating plate, which are not in contact with the journal, varies between one- and one-half inches and two inches.

My invention consists of an improved lubricant distributing plate positioned between a grease cake and the surface of a journal, with its curved portion conforming to the curved surface of the journal, said curved portion having a central perforated portion surrounded by an imperforated peripheral marginal portion, said imperforated peripheral marginal portion having pockets distributed throughout its entire concave surface, and said curved portion provided with side and end flanges depending from the side and end edges respectively of said curved portion.

The principles underlying the operation of my improved lubricant distributing plate are as follows: Grease is fed through the perforations in the central portion of the curved portion of the lubricant distributing plate and works its way outwardly in all directions over the concave surface of the imperforated marginal portion of the curved portion of the lubricant distributing plate, filling the pockets therein. The lateral and circumferential movement of the journal aids in the distribution of the grease over the concave surface of the imperforated portion of the curved portion of the lubricant distributing plate. The upper surface of the grease cake, which presses against the convex surface of the imperforated marginal portion of the curved portion of the lubricant distributing plate, tends to resist the upward movement of the grease cake toward the journal, thereby restricting the amount of grease fed through the perforated portion of the curved portion of the lubricant distributing plate to approximately the amount which may be usefully consumed. As the temperature of the journal rises, the upper portion of the grease cake is softened and feeds through the perforated portion of the curved portion of the lubricant distributing plate at an increased rate so as to satisfy the increasing requirement. A temporary temperature difference between the hub and tail ends of the journal does not result in any waste of grease at the hub since the grease near the hub, which has temporarily become softer than the rest of the grease, cannot escape before the temperature is equalized over the entire area of the metallic lubricant distributing plate. The pockets distributed throughout the concave surface of the imperforated portion of the curved portion of the lubricant distributing plate hold sufficient grease to care for temporary increased demands for lubricant until a replenishing supply arrives from the perforated portion of the curved portion of the lubricant distributing plate.

The principles of my invention may be applied to the conventional type of lubricant distributing plate, as shown in Figures 1, 2 and 3 of the drawing, by the employment of a baffle member 20 made of sheet metal or other suitable material and attached to the convex surface of the perforated curved member 14 of the curved portion of the lubricant distributing plate 13 so as to prevent the flow of grease through the perforations 19 in the peripheral marginal portion of the curved portion of the lubricant distributing plate. The blind perforations above the baffle member 20 are transformed into pockets by the addition of baffle member 20 and function in the same manner as the pockets mentioned before. The side flanges 15 and 16 and the end flanges 17 and 18 should preferably be imperforated so as to prevent the escape of grease at the sides and ends of the upper part of the grease cake which is adjacent to the curved portion of the lubricant distributing plate. The marginal width of the baffle members used in specimens of my invention in actual service was approximately one and one-half inches for ten inch journals.

Figure 4 of the drawing shows a lubricant distributing plate 22 especially constructed to embody the principles of my invention and this distributing plate operates in the same manner as the conventional plate 13 now in general use with baffle member 20 attached thereto.

Tests made with my invention show that lubricant waste has been practically eliminated and that the consumption of grease has been reduced from pounds to ounces per thousand miles traveled by locomotives operating in all services.

Having thus disclosed my invention, it will be apparent that I have provided a lubricating device which is economical in the consumption of lubricating material and which efficiently distributes the lubricant so as to safeguard the journal in a manner consistent with public safety.

It is understood that modifications may be made in the form of my invention without departing from the scope of the appended claims.

What I claim is:

1. In a journal lubricator, a lubricant distributing plate comprising a curved portion for engaging the lower surface of a journal, flanges depending from the side and end edges of the curved portion, said curved portion having a central perforated portion surrounded by a marginal imperforated portion, said marginal imperforated portion having pockets throughout its concave surface.

2. In a journal lubricator, a lubricant distributing plate comprising a curved portion for engaging the lower surface of a journal, flanges depending from the side and end edges of the curved portion, said curved portion comprising a curved member perforated throughout, and means for closing the perforations located throughout the peripheral marginal portion of said perforated curved member, at the point where they meet the convex surface of said perforated curved member to form pockets opening at the journal engaging surface of said curved portion.

3. The combination with a journal lubricant distributing plate comprising a curved portion for engaging the lower surface of a journal and flange members depending from the side and end edges thereof, said curved portion having a curved member perforated throughout its surface, of an imperforated baffle member positioned against the convex surface of the peripheral marginal portion of said perforated curved member.

4. In a journal lubricator, a lubricant distributing plate having a curved portion for engaging the lower surface of a journal, said curved portion having a perforated central portion surrounded by a marginal imperforated portion, said marginal imperforated portion having pockets throughout its concave surface, flanges depending from the side and end edges of said curved portion, a cake of lubricating material disposed below the entire convex surface of said curved portion, and means for urging said cake of lubricating material toward the journal for the purpose of feeding lubricating material through the perforated central portion of the said curved portion, said means also supporting said lubricant distributing plate against the journal.

5. In a journal lubricator, a lubricant distributing plate comprising a curved portion for engaging the lower surface of a journal and flange members depending from the side and end edges of the curved portion, said curved portion having a curved member perforated throughout its surface, an imperforated baffle member positioned against the convex surface of the peripheral marginal portion of said perforated curved member, a cake of lubricating material disposed below the convex surface of said perforated curved member and its associated baffle member, and means for urging said cake of lubricating material through the portion of the perforated curved member not covered by said baffle member, said means also supporting said lubricant distributing plate against the journal.

6. In a journal lubricator, a lubricant distributing plate comprising a curved portion for engaging the journal and flanges depending from the side and end edges of said curved portion, said curved portion having a curved member perforated throughout its surface, and an imperforated baffle member coextensive with and positioned adjacent to the convex surface of said curved perforated member and having a central portion removed therefrom.

7. In a journal lubricator, a lubricant distributing plate having a portion curved for engaging the surface of a journal, said curved portion having a central perforated portion surrounded by a peripheral marginal imperforated portion containing pockets throughout the concave surface of said peripheral marginal imperforated portion.

8. In a journal lubricator, a lubricant distributing plate comprising a portion curved for engaging the surface of a journal, said curved portion having a central perforated portion surrounded by imperforated marginal side and end portions, said end portions having pockets throughout the concave surfaces thereof, and flanges depending from the outer edges of said curved portion.

9. In a journal lubricator lubricant distributing plate comprising a curved portion for engaging the surface of a journal, a portion of said curved portion being perforated for feeding lubricant to said journal, and flanges depending from the side and end edges of said curved portion, imperforated marginal end portions of said curved portion of the lubricant distributing plate, said imperforated marginal end portions having pockets throughout the concave surfaces thereof.

FRED C. LANGDON.